(12) United States Patent
Basler

(10) Patent No.: US 8,047,895 B2
(45) Date of Patent: Nov. 1, 2011

(54) MACHINING DEVICE COMPRISING A MEASURING DEVICE FOR A MODEL

(75) Inventor: Franz Basler, Laudenbach (DE)

(73) Assignee: Sirona Dental Systems GmbH, Bensheim (DE)

( * ) Notice: Subject to any disclaimer, the term of this patent is extended or adjusted under 35 U.S.C. 154(b) by 921 days.

(21) Appl. No.: 11/990,446

(22) PCT Filed: Aug. 16, 2006

(86) PCT No.: PCT/EP2006/008084
§ 371 (c)(1),
(2), (4) Date: Feb. 14, 2008

(87) PCT Pub. No.: WO2007/020072
PCT Pub. Date: Feb. 22, 2007

(65) Prior Publication Data
US 2009/0088048 A1    Apr. 2, 2009

(30) Foreign Application Priority Data
Aug. 16, 2005  (DE) .......................... 10 2005 039 010

(51) Int. Cl.
*B24B 49/12* (2006.01)
(52) U.S. Cl. .................................. 451/6; 451/61; 451/9
(58) Field of Classification Search .................. 451/5, 6, 451/7, 9, 61, 28
See application file for complete search history.

(56) References Cited

U.S. PATENT DOCUMENTS

| | | | |
|---|---|---|---|
| 4,581,808 A | 4/1986 | Lawson et al. | |
| 4,962,539 A | 10/1990 | Takeo et al. | |
| 5,025,592 A | 6/1991 | Yamamori et al. | |
| 5,097,632 A | 3/1992 | Yamamori et al. | |
| 5,392,122 A | 2/1995 | Ulanov et al. | |
| 5,831,734 A | 11/1998 | Van Tooren et al. | |
| 6,614,538 B1 | 9/2003 | Basler et al. | |
| 6,702,649 B2 | 3/2004 | Basler | |

FOREIGN PATENT DOCUMENTS

| | | |
|---|---|---|
| DE | 4030175 | 3/1992 |
| DE | 4030185 | 3/1992 |
| DE | 10345993 | 5/2005 |

OTHER PUBLICATIONS

English Abstract of DE 4030175.
English Abstract of DE 10345993.

*Primary Examiner* — Robert Rose
(74) *Attorney, Agent, or Firm* — Dykema Gossett PLLC

(57) ABSTRACT

The invention relates to a machining device (5) comprising a workpiece (8) and at least one machining tool (23, 40, 41) and a measuring device (1, 22) and a seat (20) for the workpiece (8) to be machined. The workpiece (8) has a reference surface (26, 32, 33) that is disposed on the workpiece (8) and interacts with the machining device (5) in such a manner that a contour can be produced on this reference surface (26, 32, 33) using the machining tool (23, 40, 41) and that the contour (34, 35, 50) can be detected by the measuring device (1, 22) after machining. The method for controlling a machining device (5) comprises the following steps: introducing a contour (34, 35, 50) into the workpiece (8) to be machined in the longitudinal direction of advance of the machining tool (23, 40, 41); measuring the contour (34, 35, 50) in the workpiece (8) produced by machining; adjusting the machining plan while taking into consideration the determined tool geometry.

3 Claims, 5 Drawing Sheets

MACHINING DEVICE COMPRISING A MEASURING DEVICE FOR A MODEL

TECHNICAL FIELD

The invention relates to a machining device comprising a scanning device for a model. Machining devices are subject to wear during use. The signs of wear are of a varying nature. For example, the tip of conical machining tools flattens due to wear. The diameter of cylindrical machining tools changes in a variety of ways. Likewise, depressions form on parts of the end face of the machining tool.

PRIOR ART

In the case of long, conical instruments, their length is measured, in order that conclusions can be drawn on the degree of flattening of the tip and the abrasion of the lateral surface. This changed contour is allowed for when computing the machining schedule. In the case of cylindrical tools or standard conical tools, in addition to measuring the length of the tool, the radius of the lateral surface is measured in the context of further touch measuring. These values are also allowed for when computing the machining schedule.

DE 40 30 175 A1 discloses a grinding machine in which a fork light barrier is used to measure different known values for calibrating the starting position. A control program or the starting position is corrected based on the deviation of the measured values from the desired values. The tool is advanced toward a reference surface in small increments and the distance covered is measured. When the tool, rotating slowly, comes into contact with the reference surface, the change in its rotational speed is registered. This is referred to as "touch measuring".

DE 199 50 780 A1 discloses a machining unit comprising an accommodating unit and a scanning unit. First, a model of the item to be produced from the workpiece is scanned using the scanning unit. Then the item is carved from the workpiece. The scanning unit is in the form of a position-sensitive sensor.

DE 689 27 719 T2 discloses a numerically controlled machine tool. The machine tool comprises devices for error correction of machining inaccuracies resulting from deviations of the machined dimensions on a workpiece or deviations in tool length. In addition, provisional machining is performed initially and then the positions or heights of the surface to be machined and of a fixed reference surface are measured using a device for measuring machined dimensions. The reference surfaces are disposed on a clamping device or on a reference block.

DE 40 30 185 A1 discloses a method for calibrating a motor-driven tool in relation to a workpiece to be machined using said tool, and a device for implementing said method. According to one embodiment, a tool can be used to create a shoulder on the workpiece, which shoulder is illuminated by means of a light-emitting diode. The shadow cast by the illuminated shoulder is measured with a sensor element and the resulting measurements are used as a basis for drawing conclusions on the dimensions of the tool.

A method for determining current positional data of a machining tool is described in DE 101 04 287 A1. In the method disclosed, the tool is fed toward the reference surface of the workpiece and the reference surface is moved past the tool. When the tool comes into contact with the reference surface, there results removal of material, albeit only to a slight degree, but sufficiently so to decelerate the tool and make it possible to determine the position of the tool.

It is an object of the present invention to make an allowance for the abrasion of the tool with increased precision.

SUMMARY OF THE INVENTION

According to the invention, the machining device comprises a workpiece, a scanning device and at least one machining tool for the workpiece to be machined, and accommodation means for the workpiece to be machined. The workpiece comprises a reference surface, which is disposed on the workpiece such that a contour can be produced on this reference surface by the machining tool and subsequently the incised contour can be scanned by the scanning device.

The state of the tool tip can be determined with high precision by scanning the contour produced by the machining tool.

Preferably, means are included for determining the position of the machining tool relative to a machining axis.

The scanning device is preferably a position-sensitive sensor, in particular, a point sensor.

According to a development of the invention, an evaluation device is provided, by means of which the data of the contour acquired by the scanning device can be analyzed and a machining schedule can be adapted.

The reference surface preferably forms part of the workpiece and is disposed in an area which is located outside that region of the workpiece that is to be machined and which is irrelevant to the final machining operation on the workpiece.

Another object of the present invention is to provide a method for controlling a machining device, comprising the following steps:
  incising a contour in the longitudinal feed direction of the machining tool in the workpiece to be machined such that the contour corresponds to the contour of the tool;
  measuring the contour incised in the workpiece;
  adapting the machining schedule to allow for the tool contour thus determined.

In order to further assess the behavior of the machining tool, the workpiece can be additionally machined in the transverse direction. The degree of bend of the tool is determined by scanning the contour produced by this machining operation, and the machining schedule can be adapted to allow for such bending of the tool.

Advantageously, the contour can be made with the tool operating under a relevant working load. By this is meant a load such as typically occurs during a machining operation so that the relevant effects influencing the result of the grinding process, such as the amount of bend of the tool, changes in the contour of the tool, stability of the machining device, and material properties, are recorded as in a real machining situation. This procedure thus differs from a procedure for determining tool positions or the position of the workpiece in the machining device by a touch measuring procedure.

Advantageously, the contour can be placed on a reference surface or, more effectively, in the material to be machined.

BRIEF DESCRIPTION OF THE DRAWINGS

The method of the invention is explained with reference to the drawings, in which.

EMBODIMENT OF THE INVENTION

Figure 1:
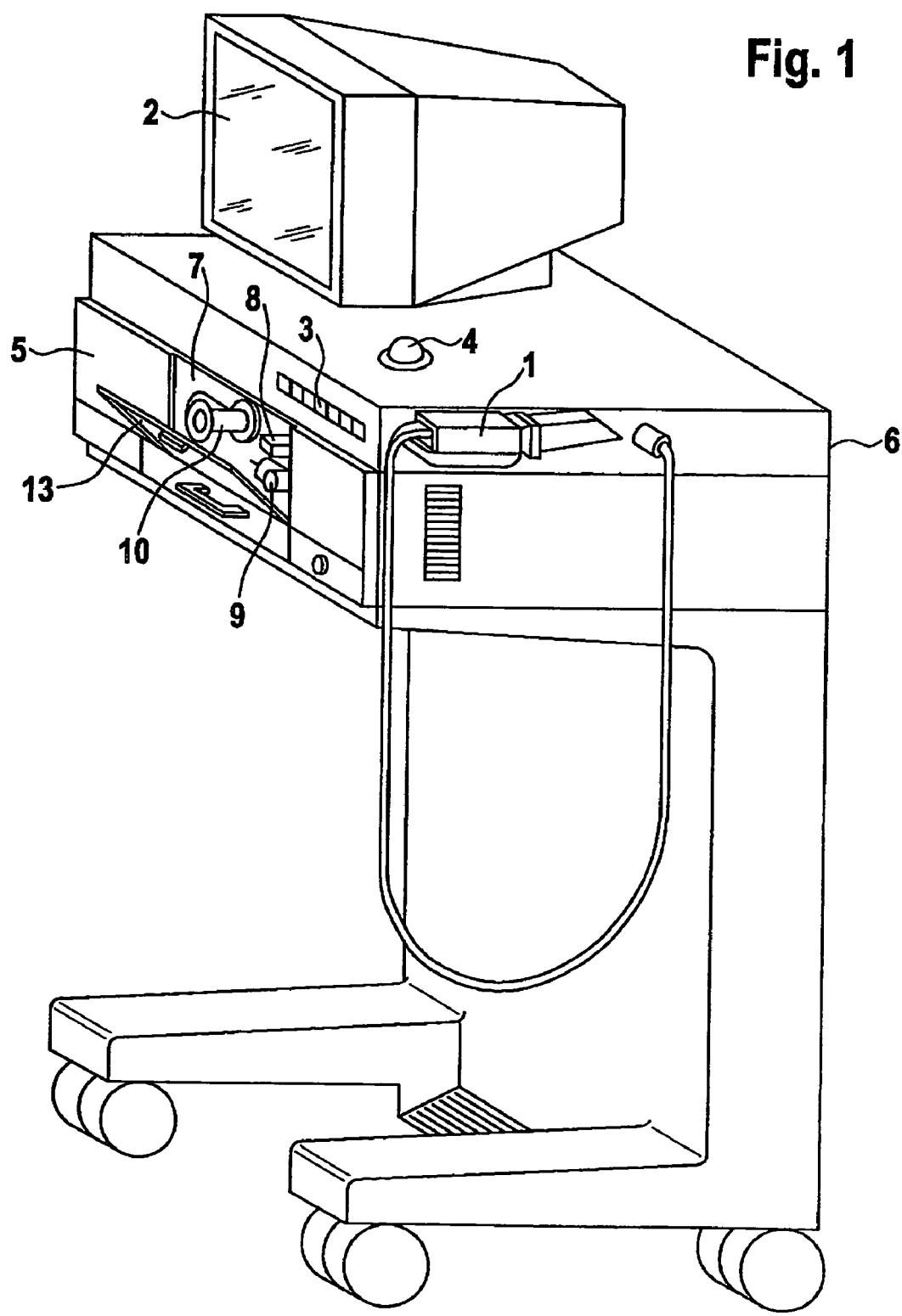
FIG. 1 is a dental device for mapping a dental preparation site and for designing a dental prosthetic item and for machining a blank in order to produce the dental prosthetic item.

FIG. 1 shows an overall layout of a dental machining device 5 for the production of a dental prosthetic item. The individual components of the machining device 5 are an optical camera 1, a monitor 2, a keyboard 3, a trackball 4, a machining device denoted as a whole by reference numeral 5, and other mechanical, electrical and electronic components (not shown) contained in a housing 6. The basic structure of such a device is disclosed in DE 40 30 175 A1.

In the housing 6, a machining chamber 7 is present in which there is a mounting and holding device for a workpiece 8, from which the desired prosthetic item is to be created, and two opposing spindle systems 9 and 10, each of which carries two tools for machining the workpiece 8. The machining chamber 7 can be closed by a cover 13 during machining. Instead of the camera 1, a scanning device (not shown), such as the one disclosed in DE 199 50 780 A1, can be installed in the machining chamber 7.

Figure 2:
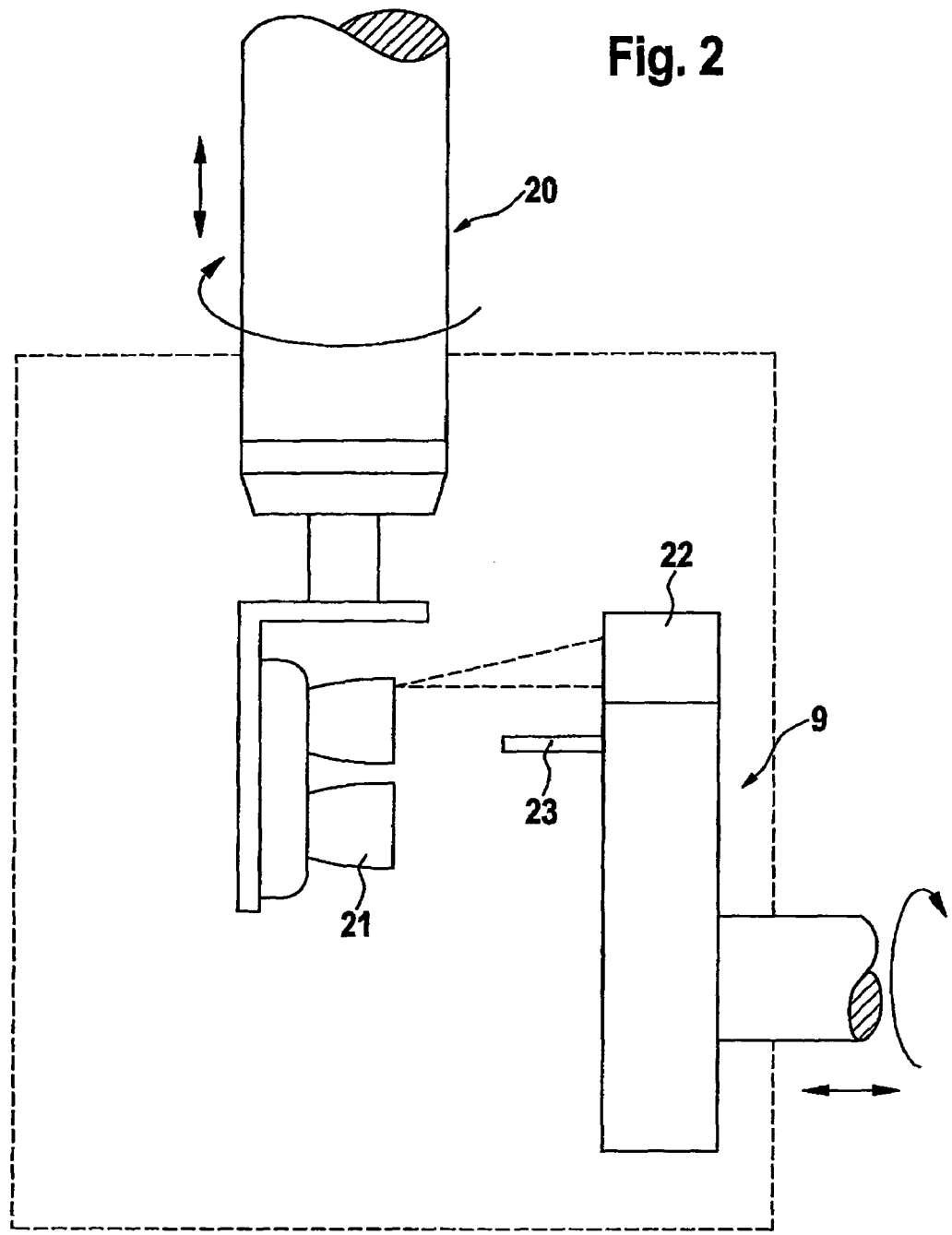
FIG. 2 shows a machining device of the invention with its essential components.

In FIG. 2, the machining device 5 of the invention is shown in more detail with regard to its essential components. The figure shows accommodation means 20 for the workpiece 8 or, as shown, for a model 21, and a scanning device 22, which is disposed on the tool spindle 9 and can be used to scan the model 21. The accommodation means 20 is designed such that in its first state, the model 21 is mounted for scanning purposes, and in a second state, the workpiece 8 is mounted for the purpose of being machined by the machining tool 23.

Figure 3:
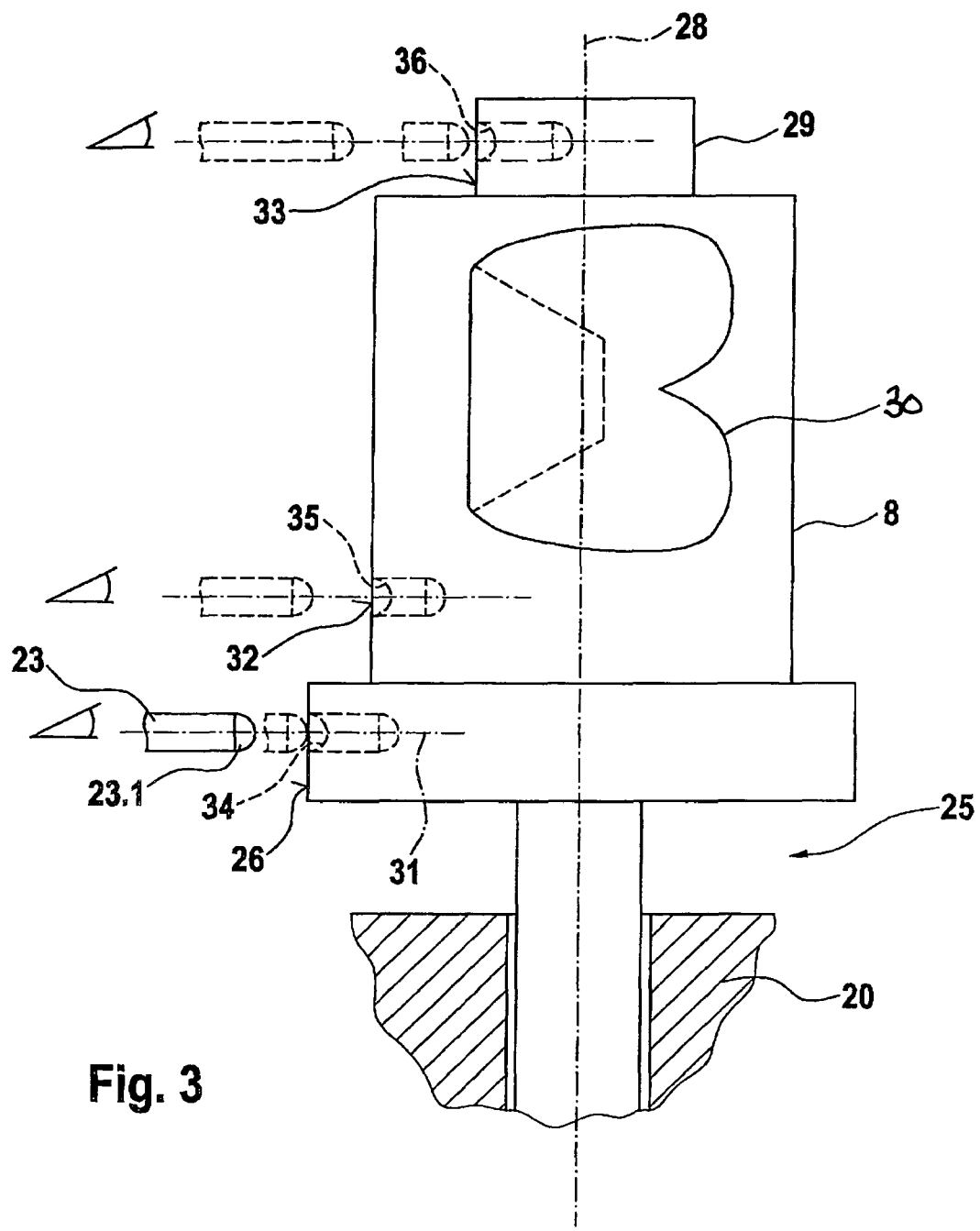
FIG. 3 shows the manner of interaction between the machining tool and the workpiece.

FIG. 3 shows the manner in which a machining tool 23 interacts with the workpiece 8. The workpiece 8 itself is mounted on a holder 25, which in turn is mounted in the accommodation means 20. A reference surface 26 can be provided on the holder 25 for touch measurement in order to determine the precise position of the tool 23 relative to a machining axis 28. The reference surface 26 can also be located on a reference body 29 disposed on the workpiece 8 and can thus be independent of the holder 25.

The machining tool 23 can be brought into a position which lies outside the area to be machined illustrated by the crown 30 drawn inside the workpiece 8 as an example of a dental prosthetic item to be produced. For example, the machining tool 23 can be brought into a position located on the holder 25, on the workpiece 8 itself or on the reference body 29.

The tool 23 is fed along its longitudinal axis 31 toward a reference surface 26 provided for this purpose and touch measurement is carried out in a first step, i.e. the point of contact of the tool 23 with the reference surface 26, 32 or 33 is registered and used for determining the position of the tool 23. Such touch measurement may be dispensed with if the position of the tool tip 23.1 is already known.

As the tool 23 is further advanced, the reference surface 26 is machined such that a contour 34 is incised which corresponds to that of the tool 23. The tool 23 is a rotating tool and the contour 34 thus created is therefore radially symmetrical.

The penetration depth of the tool 23 depends on the desired type of analysis. In the case of a cylindrical grinder, the penetration depth can be approximately equal to the diameter of the cylindrical grinder. In the case of a long, conical grinder having a tip radius, the penetration depth can be equal to approximately 5 times the tip radius, and in the case of a conical grinder, it can be approximately equal to the height of the cone.

It is particularly advantageous when the contour 35 is created in the workpiece 8 itself, since the machining tool 23 has precisely the same effect as it would have when carving the workpiece 8 to be machined. The creation of the contour in a holder made of plastic or a fitting made of steel can negatively influence the validity of the scanning process since the material of the holder or fitting differs from that of the workpiece 8. It is particularly advantageous to create the contour 35 under a relevant working load on the tool 23. This load depends on the feed rate of the tool in the different directions and on the machined surface engaged by the tool.

In addition to creating a contour 34, 35 or 36 in the longitudinal feed direction of the machining tool 23, a contour can also be created in the transverse direction by causing transverse movement of the tool, from which inferences can be drawn on the bending behavior of the tool 23 under load. The tool 23 is thus advantageously fed over a short distance into the workpiece 8 in the longitudinal direction in order to create a feed in the transverse direction that defines a predetermined machining path, and the tool is then moved away from the workpiece 8. Depending on the amount of bend of the tool 23, machining will have been carried out in the transverse direction more or less completely.

After the production of the contour 34 or contours 35, 36, the resulting contour 34 or contours 35, 36 are scanned. The scanning device 22 present in the machining device 5 for scanning the model 21 performs this scanning operation. For this purpose, the scanning device 22 is designed such that it can also be used to scan the zone in which the contour 34 has been created. Since the position of the contour 34 to be scanned is known, the scanning device 22 is specifically directed toward this zone.

The data acquired by scanning the contour 34 permit an inference to be drawn on the state of the machining tools 23 used and also on the relevant effects influencing the result of the grinding process such as the degree of bend of the tool 23, changes in the contour of the tool 23, stability of the machining device, and material properties. These data are used in an evaluation device when computing or correcting the machining schedule. This applies both to the geometry and to the bending behavior of the machining tool 23.

Figure 4A:
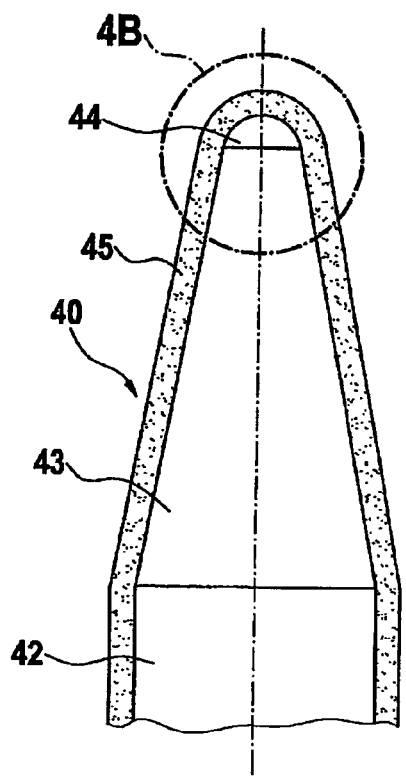
FIGS. 4A and 4B show a machining tool in the form of a long, conical grinder.
Figure 5A:
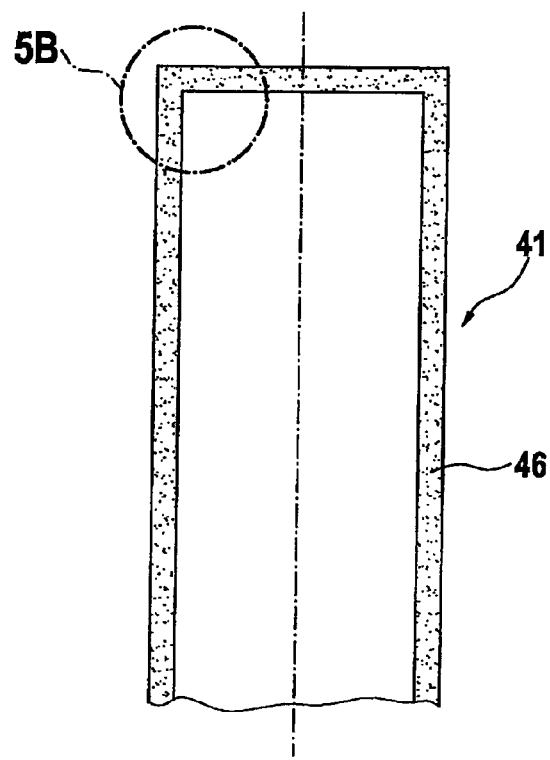
FIGS. 5A and 5B show a machining tool in the form of a cylindrical grinder.
Figure 4B:
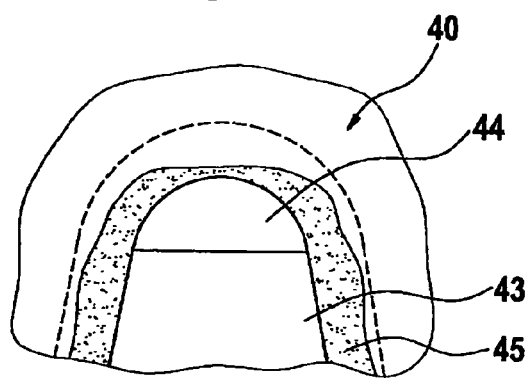
Figure 5B:
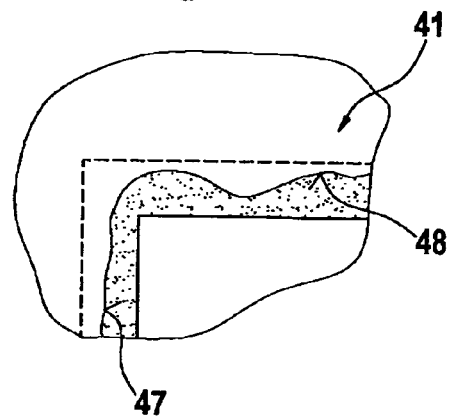

FIGS. 4A, 4B, and 5A, 5B show typical machining tools in the form of a long, conical grinder 40 in FIG. 4, and a cylindrical grinder 41 in FIG. 5. The long, conical grinder 40 shown in FIG. 4A comprises a shaft 42 having a core diameter, which shaft is adjoined by a conical region 43 tapering toward the tip at a cone angle of between 4° and 20°, and the tip 44 itself is designed as a rounded point with a radius. The long, conical grinder 40 is provided with a coating 45, which has substantially the same thickness over the entire region. This coating thickness is approx. $200 \times 10^{-6}$ m when the machining tool 40 is new and will be worn down to a coating thickness of about $50 \times 10^{-6}$ m, before the machining tool 40 is replaced. It is naturally possible to provide a coating of increased thickness, particularly in stressed regions, an example of which is the tip 44. Based on the scanning results concerning the tip 44, it is possible, according to the present invention, to provide the tip with an increased coating thickness and thus permit more abrasion before the tool 40 is considered to be worn out.

FIG. 4B shows the manner in which the outer contour of the tool 40 changes due to wear caused by abrasion. Specifically, the coating in the region of the tip 44 is flattened. By contrast, a uniform reduction in the thickness of the coating 45 is shown in the region of the long cone 43.

In the cylindrical grinder 41 shown in FIG. 5A, the coating 46 is provided on a core diameter and has a uniform thickness in the initial state of the grinder 41. FIG. 5B shows the manner in which the outer contour of the cylindrical grinder 41 has changed due to wear caused by abrasion. It can be seen that there is severe wear particularly in the region of the edge between the cylindrical surface 47 and the end face 48 of the grinder 41.

Figure 6:
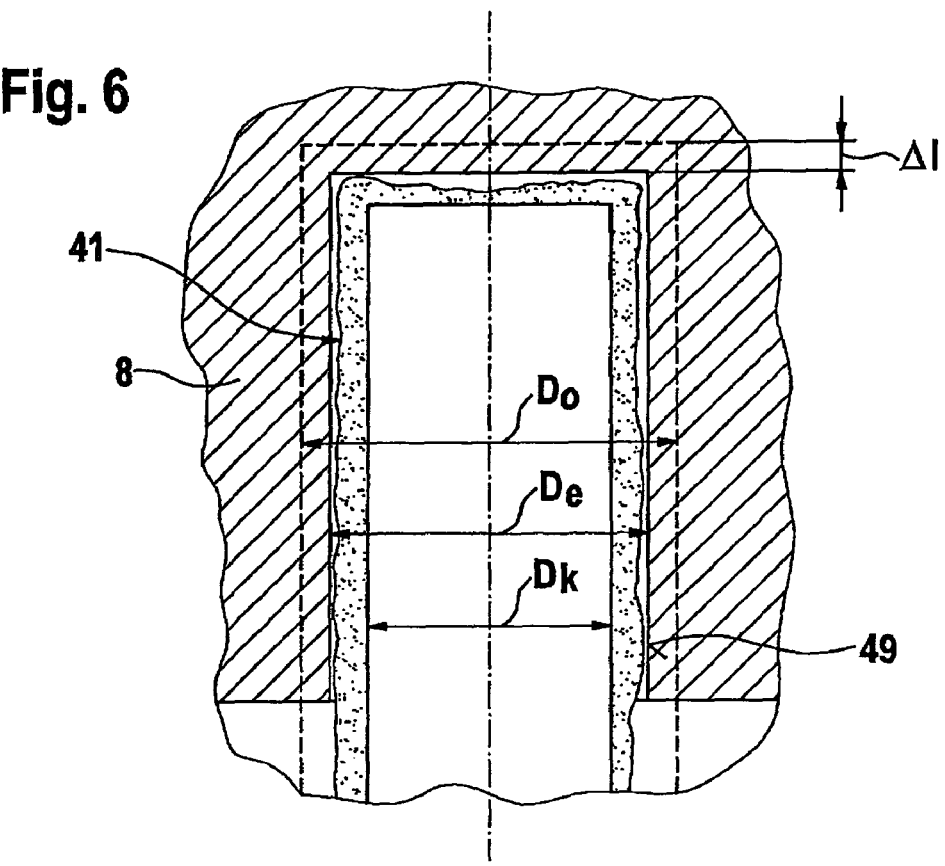
FIG. 6 illustrates the penetration of the machining tool into the workpiece.

FIG. 6 shows the manner in which the machining tool 41 shown in FIG. 5 penetrates into the workpiece 8 and carves a contour 49 therein, which is then scanned. The new tool 41 has a nominal diameter D0 and an effective diameter De, which is reduced due to use of the tool 41, and a core diameter DK. The contour created in the workpiece 8 therefore has an inner diameter, which is of the order of magnitude of the effective diameter De and can be detected by scanning. Furthermore, the depth of the contour 49 can also be determined by scanning, so that direct conclusions can be drawn on the position of the tool 41 in space, provided the position of the surface of the workpiece 8 is known. This is particularly relevant to determination of the linear change Δl resulting from wear on the tool 41.

The position of the contour 49 can be determined in the coordinate system of the machining device by, say, scanning a reference surface or causing the machining tool 41 to come into contact with the reference surface. In the case of radially symmetrical reference surfaces, usually several touch operations or scanning operations are required in order to allow for eccentricities of the reference surface in relation to the machining axis 28. Such touch operations are adequately disclosed in the prior art.

If the position of the machining tool 41 or of a measuring point of the scanning device 22 is known, then a touch operation involving causing the machining tool 41 to come into contact with a reference surface can be dispensed with, and it is sufficient to produce the contour using the machining tool 41 and to scan the same using the scanning device 22.

Figure 7:
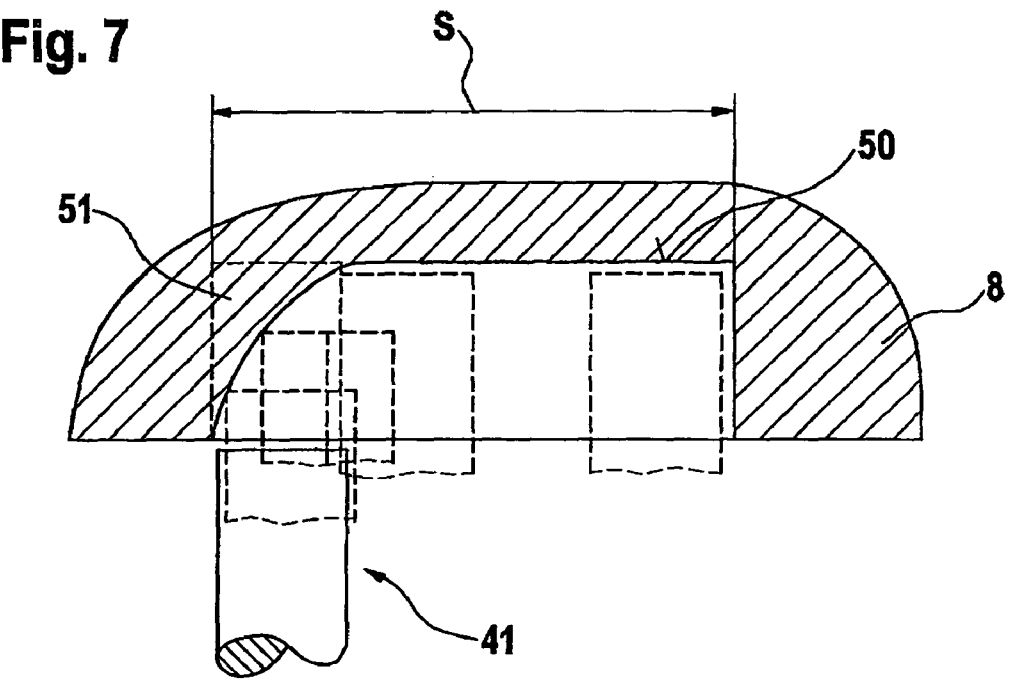
FIG. 7 shows a resulting contour.

FIG. 7 shows a contour 50 as it actually appears in the workpiece 8 during the transverse movement of the tool 41 allowing for bending of the tool 41. The machining tool 41 is advanced in the transverse direction over a predefined distance S. After the stepwise feed in the transverse direction, the machining tool 41 dug into the workpiece 8 is moved away from the workpiece 8. Due to bending of the tool 41 and a certain inertia of the system, there results an unmachined portion 51, the size of which is determined by scanning the contour 50. A correction value for the machining schedule can be computed or a new machining schedule can be created based on the size of this portion 51. This increases the accuracy of the machined workpiece 8.

Allowance is made for the influence of the material of the workpiece 8 and the state of the machining device 5 as caused, for example, by wear of the bearings and the play resulting therefrom.

The invention claimed is:

1. A method for controlling a machining device which includes a machining tool for machining a contour in a workpiece, said method comprising:
    (a) longitudinally moving the machining tool into the workpiece according to a machining schedule so as to produce a contour in the workpiece which corresponds to a contour of the machining tool,
    (b) transversely moving the machining tool relative to the workpiece to enlarge the contour produced in the workpiece,
    (c) withdrawing the machining tool from the workpiece,
    (d) scanning the enlarged contour produced in the workpiece in step (b) and determining tool bending characteristics, and
    (e) adjusting the machining schedule based on the tool characteristics determined in step (c).

2. The method according toe claim 1, wherein step (a) the machining tool is loaded into the workpiece.

3. The method according to claim 1, including rotating the machining tool during steps (a) and (b).

* * * * *